(12) United States Patent
Rana

(10) Patent No.: US 12,123,071 B2
(45) Date of Patent: Oct. 22, 2024

(54) HIGH FLANGEABLE ULTRA-HIGH STRENGTH DUCTILE HOT-ROLLED STEEL, METHOD OF MANUFACTURING SAID HOT-ROLLED STEEL AND USE THEREOF

(71) Applicant: TATA STEEL IJMUIDEN B.V., Velsen-Noord (NL)

(72) Inventor: Radhakanta Rana, Alkmaar (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 0 days.

(21) Appl. No.: 17/760,448

(22) PCT Filed: Feb. 11, 2021

(86) PCT No.: PCT/EP2021/053290
§ 371 (c)(1),
(2) Date: Aug. 9, 2022

(87) PCT Pub. No.: WO2021/160721
PCT Pub. Date: Aug. 19, 2021

(65) Prior Publication Data
US 2023/0081354 A1 Mar. 16, 2023

(30) Foreign Application Priority Data
Feb. 11, 2020 (EP) ..................... 20156728

(51) Int. Cl.
*B32B 15/01* (2006.01)
*C21D 6/00* (2006.01)
(Continued)

(52) U.S. Cl.
CPC .............. *C21D 9/52* (2013.01); *B32B 15/012* (2013.01); *B32B 15/013* (2013.01); *C21D 6/005* (2013.01);
(Continued)

(58) Field of Classification Search
CPC ... B32B 15/012; B32B 15/013; C21D 8/0205; C21D 8/0226; C21D 2211/008;
(Continued)

(56) References Cited

U.S. PATENT DOCUMENTS 10,087,499 B2 10/2018 Shuto et al.
2015/0017471 A1 1/2015 Shuto et al.
2020/0071785 A1 3/2020 Ahrenhold et al.

FOREIGN PATENT DOCUMENTS

EP 1870483 A1 12/2007
EP 2759615 A1 7/2014
(Continued)

OTHER PUBLICATIONS

Hirata et al., JP2016160499A Google Patents machine translation printed on Jul. 24, 2023, Sep. 4, 2016, entire translation (Year: 2016).*

(Continued)

*Primary Examiner* — Katherine A Christy
(74) *Attorney, Agent, or Firm* — Vorys, Sater, Seymour and Pease LLP

(57) ABSTRACT

A hot-rolled (HR) strip steel with high flangeability at ultra-high strength levels with a high total elongation, bendability and toughness values, and a method of manufacturing the hot-rolled steel and use thereof.

20 Claims, 3 Drawing Sheets

(51) Int. Cl.
  *C21D 8/02*   (2006.01)
  *C21D 9/52*   (2006.01)
  *C22C 38/00*  (2006.01)
  *C22C 38/02*  (2006.01)
  *C22C 38/04*  (2006.01)
  *C22C 38/06*  (2006.01)
  *C22C 38/12*  (2006.01)

(52) U.S. Cl.
  CPC ........... *C21D 6/008* (2013.01); *C21D 8/0205* (2013.01); *C21D 8/0226* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C21D 2211/008* (2013.01)

(58) Field of Classification Search
  CPC ..... C22C 38/001; C22C 38/002; C22C 38/02; C22C 38/04; C22C 38/06; C22C 38/12
  USPC ....................................................... 428/653
  See application file for complete search history.

(56) References Cited

FOREIGN PATENT DOCUMENTS

| | | |
|---|---|---|
| EP | 2907886 A1 | 8/2015 |
| JP | 2016160499 A * | 9/2016 |
| WO | 2004026497 A1 | 4/2004 |
| WO | 2008102009 A1 | 8/2008 |
| WO | 2013004910 A1 | 1/2013 |
| WO | 2018108653 A1 | 6/2018 |

OTHER PUBLICATIONS

Written Opinion of the International Searching Authority and International Search Report for corresponding PCT Application No. PCT/EP2021/053290 filed Feb. 11, 2021.

* cited by examiner

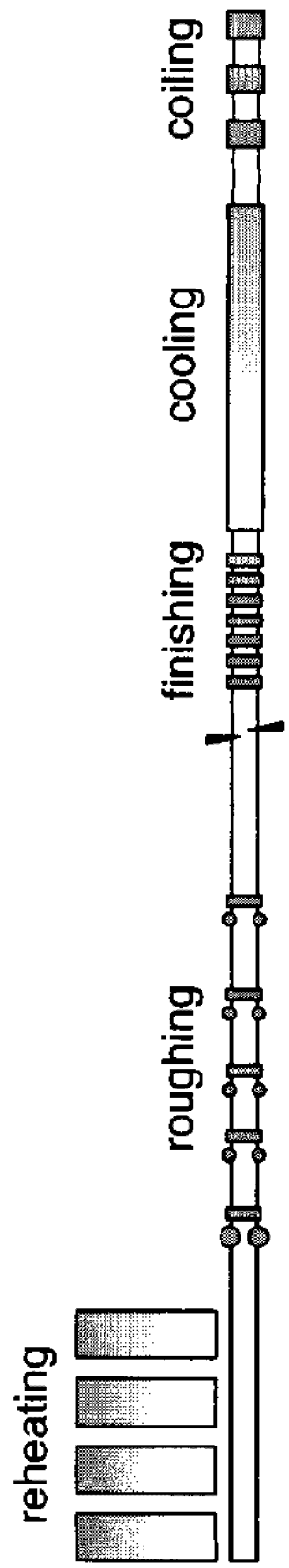
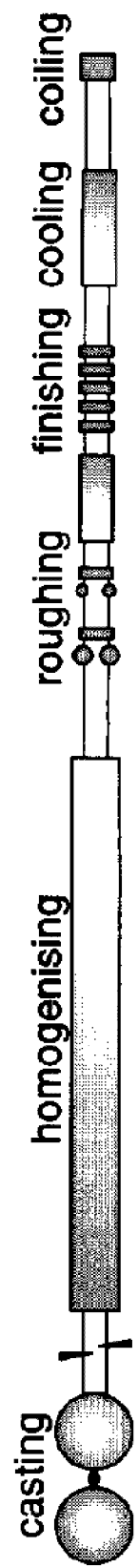
FIGURE 2A
FIGURE 2B

HIGH FLANGEABLE ULTRA-HIGH STRENGTH DUCTILE HOT-ROLLED STEEL, METHOD OF MANUFACTURING SAID HOT-ROLLED STEEL AND USE THEREOF

FIELD OF THE INVENTION

The present invention relates to a hot-rolled (HR) strip steel with high flangeability at ultra-high strength levels with a high total elongation, bendability and toughness values, to a method of manufacturing said hot-rolled steel and use thereof.

BACKGROUND OF THE INVENTION

It is well-known that as the strength of hot-rolled (HR) steel increases, the formability decreases. A major area of application for HR steels in transport and automotive applications is the chassis and suspension (C&S) such as in the lower control arm. Other areas are frame rails of trucks, bumper beams or battery boxes for electrical vehicles. The typical thickness of HR steels used for these applications is less than 4.5 mm. Thicker gauge HR strip steels such as up to 12 mm can be used in engineering applications such as crane booms or in transport applications for frames of heavy trucks.

From the weight reduction perspective it is imperative that higher strength steels should be employed for the above applications in order to be able to reduce the gauge of the steel strip. Therefore, ultra-high strength steels (UHSS) with ultimate tensile strength (Rm) of typically over 1000 MPa would be useful for this purpose.

These applications of the HR steels demand mechanical properties that are difficult to reconcile. Beside a high strength the steel should also have good formability for making the component via cold-forming because this is an energy efficient manufacturing route in comparison with hot-forming. Furthermore, good impact toughness or energy absorption capacity is also required for applications like bumper beams, battery housings, crane booms or frame rails. For assembling the components, also a good weldability, typically characterised by a low carbon equivalent of the steel, is also needed.

However, as the tensile strength of the steels increases the formability parameters decrease. Formability is a generic term for steel sheets which is viewed as a combination of material behaviour during several mechanical operations such as stretching, bending, drawing and flanging. Depending on the component geometry any or a combination of two or more attributes of the material is of importance during sheet metal forming. For typical automobile C&S parts, stretch-flangeability is also important. This type of formability requires high hole expansion capacity (HEC) and good total elongation. For making frame rails, bumper beams or battery housing, which are typically manufactured by roll-forming, bendability is important. Manufacturing of crane booms also requires good HEC, bendability and elongation.

Achieving a high formability and high impact toughness values in steels at ultra-high strength levels is challenging.

OBJECTIVES OF THE INVENTION

It is an object of the invention to provide a hot rolled steel strip having an ultra-high strength combined with high flangeability, good elongation, bendability and impact toughness.

It is also an object of the invention to provide a hot rolled steel strip having excellent weldability.

It is also an object of the invention to provide a method to produce such steels.

DESCRIPTION OF THE INVENTION

One or more of the objects is reached the hot-rolled steel according to claim 1. Preferred embodiments are disclosed in any of the dependent claims.

According to a second aspect the invention is also embodied in the method according to claim 10 to produce the steels according to the invention.

According to a third aspect the invention is also embodied in the use of the hot-rolled steel for the production of a part for transport or an engineering applications.

The steel according to the invention contains carbon, silicon, aluminium and manganese as essential elements. The ranges of the contents of these alloying elements (in wt. %) in the steel are as follows:

C: 0.10-0.30;
Si: 0.50-1.50;
Al: 0.010-1.00;
Mn: 1.00-3.00;
where (Si+Al)≥0.80;
and optionally any one or more of the following alloying elements:
V: less than 0.10;
Nb: less than 0.10;
Ti: less than 0.10;
Mo: less than 0.50;
Cr: less than 1.50;
Cu: less than 1.00;
Ni: less than 0.50;
B: less than 0.0030 (30 ppm);
unavoidably also comprising
N: less than 0.0100 (100 ppm).
S: less than 0.005;
P: less than 0.020;
the remainder being Fe and other unavoidable impurities resulting from the ironmaking and steelmaking process.
It is noted that all compositional percentages are given as wt. %, unless indicated otherwise.

Carbon is present in the steel in an amount of 0.10-0.30%, preferably 0.10-0.26%, more preferably 0.10-0.23%. Carbon, which causes strong solid solution hardening in iron, is added mainly in view of strength and hardenability. Carbon ensures that during run-out table cooling after hot rolling, the austenite does not transform to ferrite and/or pearlite above a critical cooling rate (20° C./s). Less than 0.10% C will not give the desired Rm level of 1000 MPa or more, preferably of 1200 MPa or more, and if C is higher than 0.30%, the weldability of the formed parts might become poor. The weldability is also improved by the low carbon equivalent value. A suitable minimum value for carbon is 0.16%.

Silicon is added in an amount of less than 1.50% for increasing strength by substitutional solid solution strengthening in iron lattice. The other important effect of Si in steels is that Si slows down carbide precipitation (cementite and other carbides). As a result, the martensite phase when subjected to tempering will not form detrimental iron carbides in its matrix. When Si is less than 0.50%, the effects of strengthening and suppression of carbide formation are insufficient to obtain the intended benefits. On the other hand, when Si is above 1.50%, there can be excessive oxide formation during thermomechanical processing (slab reheating, hot rolling, coiling etc.) of the steel. These oxide scales are detrimental for hot rolling, pickling, coating and overall surface appearance. Also, the rolling forces during hot rolling increase and the steel becomes brittle when the Si content exceeds 1.50% to such a level making the steel very difficult to hot-roll. Thus, the amount of Si according to the invention is typically more than 0.50% and less than 1.50%, preferably in the range of 0.60% and 1.30%, more preferably in the range of 0.70 to 1.10%.

Aluminium behaves comparable to Si in the steel according to the invention. It acts as a solid solution strengthening element in steel when added deliberately. It also slows down the carbide precipitation kinetics during tempering of martensite. When Al is less than 0.030%, the effects of strengthening and suppression of carbide formation are negligible. Values of aluminium lower than 0.030% are deemed to be residuals from the deoxidation step during steelmaking, and therefore a minimum value of 0.030% is preferable. On the other hand, when Al is above 1.00%, there can be excessive oxide formation during thermomechanical processing (slab reheating, hot rolling, coiling etc.) of the steel. Also, Al increases the ferrite to austenite transformation temperature demanding the need for hot rolling the steel at higher temperatures to finish hot-roll in the austenitic phase since at lower temperatures intercritical ferrite appears. Higher amounts of oxidation can occur at higher temperatures. These oxide scales are detrimental for hot rolling, pickling, coating and overall surface appearance. Also, the rolling forces during hot rolling increase when the Al exceeds 1.00% in combination with the presence of Si to such a level making the steel very brittle and difficult to hot-roll. Moreover, Al content above 1.00% can also promote ferrite formation during the cooling on the run-out table by reducing the incubation time for ferrite formation during continuous cooling. Ferrite is a detrimental phase for this invention since it will introduce brittle interfaces with fresh martensite and tempered martensite. These interfaces will act as nucleating sites for damage initiation due to deformation reducing the formability, elongation and impact toughness of the steel. Therefore, Al in the present invention is present in an amount of 0.010-1.00%, preferably 0.030-1.00%, preferably 0.20-0.80%, more preferably in the range of 0.30-0.80%.

While Si or Al individually can give the effects of solid solution strengthening and prohibition of carbide precipitation during tempering of martensite, when both the elements are present the synergistic effect of these elements is also similar to their individual effects. Therefore, the total content of (Si+Al) in this invention should be at least 0.80%, preferably at least 1.00% to achieve the desired carbide-suppressing effects and the desired strength levels. When Al and Si are both present, there can be several advantages facilitating the processing of the steel, particularly during hot rolling, pickling and coating. Presence of some amount of Al with Si changes the oxide characteristics in the scales during high temperature processing. This makes pickling of the scales after hot rolling easier.

As will be disclosed later, the initial martensite that forms in the hot-rolled steel during coiling stage tempers during coil cooling in this invention. The suppression of carbide formation during this auto-tempering (coil cooling) of the steel due to individual or synergistic effects of Si and Al is important for the invention. As a result, the martensite reduces its dislocation density only without forming carbides. Carbides are detrimental to elongation, formability and impact toughness of the steel as those are brittle in nature and act as nucleation sites for damage initiation during deformation.

Manganese is present in an amount of 1.00-3.00%. The main effect of Mn is to increase the strength and toughness. At levels below 1.00 wt. % the effects aimed for are not achieved, while at amounts above 3.00% problems in casting and segregation will be caused. Also, the deformation mechanism in the steel may change to transformation induced plasticity (TRIP) because of austenite stabilisation by Mn to room temperature which is not conducive to achieve a good combination of all the mechanical properties aimed in the product (i.e. impact toughness, formability, strength). Preferably the Mn content is in the range of 1.20-2.70%. In an embodiment Mn amounts to 1.40-2.60%, preferably to 1.50-2.50%, more preferably to 1.60-2.50%. In an embodiment a suitable minimum amount of Mn is 1.65% and a suitable maximum amount of Mn would be 1.95%.

Apart from the above-described effects of the essential alloying elements in the inventive steel, i.e. C, Si, Al and Mn, another collective effect of these alloying elements is to increase the hardenability of the steel. They help avoiding formation of pearlite or ferrite phases during cooling after austenitisation. This feature allows the steel to avoid these phases above a certain cooling rate during run-out table cooling after hot rolling and prior to coiling. Presence of these softer (ferrite) and inhomogeneous (pearlite) phases is detrimental to obtaining good mechanical and formability properties in the final product because they promote brittle and incoherent interphases in the microstructure.

One or more micro-alloying elements, selected from the group V, Nb, Ti and Mo, are optionally present. These micro-alloying elements increase the strength through precipitation hardening by their carbides, nitrides or carbonitrides. They also improve weldability of the steel.

Chromium, another optional element for this invention, also increases the hardenability of the steel.

Copper, when present, increases the strength of the steel by both solid solution strengthening as well as precipitation hardening through copper precipitates. Nickel increases the impact toughness and counters any hot shortness that can occur during hot working of the steel due to the presence of copper.

If present as alloying elements, the preferred additions of these optional alloying elements (in wt. %) are:

V: 0.010-0.10
Nb: 0.010-0.10
Ti: 0.010-0.10
Mo: 0.050-0.50
Cr: 0.10-1.50
Cu: 0.030-1.00
Ni: 0.020-0.50

Nitrogen, sulphur and phosphorus are residual elements present in the steel as a result of steel making and refining process. Their amounts are limited to S<0.005% and P<0.020% and N<0.0100%. Amounts higher than these are detrimental for mechanical properties, formability and weldability. Preferably S<0.002%, N is between 0.0005 and 0.0100%. Nitrogen in the specified range gives a similar effect to C and contributes to strength by formation of carbonitrides of the microalloying elements.

The optional alloying elements and the elements nitrogen, sulphur and phosphorus can be varied independently from each other within the specified ranges. They were found to have an additive effect, not a synergistic effect, in the steels according to the invention.

According to a second aspect the invention is also embodied in a manufacturing process of a hot rolled strip that achieves the desired microstructure in the final product.

Accordingly, the method according to the invention is a method of producing the hot rolled steel with the chemistry discussed above.

The method of making the steel comprises the steps of:
casting the molten steel into slabs;
reheating the slabs, preferably at a temperature of 1100° C. or more and preferably for a time of 30 minutes or more;
rough-rolling the slab into an intermediate gauge, typically in the range of 35-45 mm, to break down the as-cast structure;
hot rolling the steel into a strip, preferably with a finish hot rolling temperature (FRT) above the Ar3 temperature of the steel, where Ar3 is the temperature where transformation of austenite to ferrite starts during cooling;
accelerated cooling of the hot rolled strip on the run-out table with a cooling rate higher than 20° C./s;
coiling the hot-rolled and cooled steel strip at a temperature in the range of (Ms-50) ° C. to (Ms-160) ° C., where Ms is the martensite start temperature (in ° C.) of the steel;
coil cooling of the steel to room temperature;
pickling the hot rolled steel strip;
optionally, coating the hot rolled strip with a Zn or Zn-based alloy or Al-based alloy or any other coating;

To avoiding misunderstanding Ms is expressed in ° C. Preferably FRT is above Ar3+50° C. FIG. 1 shows a schematic representation of the hot rolling and cooling process to the room temperature superimposed on a schematic continuous cooling transformation (CCT) diagram. Room temperature is defined about 20° C. Reheating is preferably performed for a time of 60 minutes or more, particularly when the hot-rolling process according to the invention is performed in a conventional hot strip mill based on thick slabs.

The invention is not limited by the casting method. The steel can be cast as a conventional thick-slab having a cast thickness of between 150 and 350 mm, and typically of 225 to 250 mm, as well as a thin-slab having a cast thickness of between 50 and 150 mm in direct strip plant. Schematic examples of a process involving a conventional hot strip mill and of a thin slab casting/direct rolling mill are shown in FIGS. 2a and 2b respectively. For conventional thick-slab casting, reheating of the slab is necessary to reheat the slab from ambient temperatures (usually the think cast slabs have cooled down from the casting temperature to ambient temperatures in a slab yard) and to homogenise the slab with respect to composition, and therefore the reheating temperature should be above 1100° C. also to dissolve any precipitates when microalloying elements are present and to bring the slab to such a temperature that the final hot rolling in the finishing mill can still be performed at FRT>Ar3. Often this requires a (slab) reheating temperature of between 1150 up to about 1250° C. For thin-slab casting the cast slab is subjected to a homogenisation treatment in a homogenising furnace immediately after casting the thin slab wherein the homogenisation temperature should be above 1100° C., and is typically about 1125 to 1150° C. This would also prevent any precipitates from forming when microalloying elements are present and also bring the thin slab to such a temperature that the final hot rolling in the finishing mill can still be performed at FRT>Ar3. According to the invention the reheating or the homogenisation time for the thin slab casting route is preferably 30 minutes or more.

The hot rolling of the steel must be carried out in the austenitic phase to ensure that no ferrite is present in the final microstructure. Another purpose of hot rolling in the austenitic phase is to reduce the hot rolling force, and therefore the finish rolling temperature (FRT) is preferably maintained at a temperature which is at least 50° C. higher than the Ar3 of the steel.

After hot rolling, the steel strip is cooled on a run-out table. Here the requirement is that the steel cooled at a rate higher than the critical cooling rate to avoid any undesired phase transformation from austenite. Particularly ferrite and pearlite must not form because these are detrimental to the mechanical and formability properties of the final product. So the ROT-CR must exceed the critical cooling rate to avoid the formation of ferrite and pearlite. There is no critical maximum ROT-CR because to ensure the transformation from austenite as long as the aforementioned critical cooling rate is exceeded through-thickness of the strip. An unnecessarily high ROT-CR may affect the flatness of the strip after cooling and cause control problems to stop at the correct cooling stop temperature and therefore a suitable maximum ROT-CR is about 300° C./s, preferably about 200° C./s and more preferably about 150° C./s. A practical ROT-CR range is 20 to 100° C./s as this is achievable through air cooling, laminar cooling or water jet cooling depending on the thickness of the strip. For practical reasons the run-out table cooling rate (ROT-CR) is defined as the average cooling rate of the surface of the strip.

Next, the hot rolled steel strip is coiled at a temperature below the Ms of the steel, in the temperature range of (Ms-50) ° C. to (Ms-160) ° C. Coiling below the Ms is to ensure that the subsequent coil cooling starts with a phase mixture of martensite and austenite, with the initial martensite content in the range of 40-85 vol. %. If the initial martensite content is higher than this amount, or in other words, if the cooling temperature (CT) is below Ms-160° C., then the required tempering effect of the initial martensite is not obtained and it fails to achieve high ductility, formability and impact toughness in the steel as a result of less time available during coil cooling and too low a temperature for effective tempering to occur. If the initial martensite content is lower than 40 vol. %, then excessive tempering of martensite can take place, with the product not being an ultra-high strength steel in the context of this invention.

During coil cooling, the tempering of the initial martensite continuously takes place. Simultaneously, as the steel cools down in the coil, new fresh martensite forms. Due to the presence of Si and Al in the steel, carbides do not form in the tempered martensite. In addition, due to some partitioning of carbon from martensite to austenite, very low amounts of austenite can remain untransformed at room temperature (aka retained austenite), but its amount is preferably limited to a maximum of 1 vol. %, including 0 vol. %.

After the steel has cooled to room temperature, the oxides (scale) on the hot-rolled steels are removed either by pickling in an acid solution (e.g. HCl) at warm temperatures (80-120° C.) or by a combination of pickling and mechanical brushing of the surface. This step is necessary for rendering the steel surface suitable for direct use as uncoated HR steel or making it amenable to the coating process, when optionally needed for corrosion resistance.

Optionally, the HR steel strip can be coated, e.g. by hot-dip coating or electrocoating, with Zn or a Zn-based alloy, or an Al-based alloy or any other coating technique to give good corrosion resistance in service.

The above process results in the desired microstructure to obtain the aimed mechanical properties. The invention is also embodied in a steel article manufactured according to the above process and steel chemistry containing the following microstructure (in vol. %):

Tempered martensite (initial martensite during coiling): 40-85%, preferably at least 50%, more preferably at least 60%;

Fresh martensite (martensite forming during coil cooling after coiling): 15-60%, preferably at most 50%, more preferably at most 40%;

Retained austenite: at most 1 vol. % including 0 vol. %.

Cementite or any other metal carbides: 0 vol. % The steel chemistry, process and microstructure result, according to the invention, in the following mechanical and formability properties.

Yield Strength (Rp): at least 1100 MPa
Ultimate Tensile Strength (Rm): at least 1200 MPa
Yield ratio (Rp/Rm): at least 0.85
Total elongation: at least 6.0% J155
Hole expansion capacity: at least 30%
Bending angle @1 mm thickness: at least 70° Preferably the Charpy impact toughness is at least 40 Joule at −40° C. and at least 100 Joule at room temperature.

The steel chemistry, process and microstructure result, according to the invention, preferably in the following mechanical and formability properties.

Yield Strength (Rp): at least 1100 MPa
Ultimate Tensile Strength (Rm): at least 1200 MPa
Yield ratio (Rp/Rm): at least 0.85
Total elongation: at least 8.5% J155
Hole expansion capacity: at least 50%
Bending angle @1 mm thickness: at least 80°
Charpy impact toughness: at least 40 Joule at −40° C. and at least 100 Joule at room temperature.

The strength values of the steel mainly result from the presence of its hard constituents in the microstructure. Martensite is a strong phase in steel and due to low temperature tempering below the Ms during coil cooling, martensite does not loose much of its strength. Therefore, both fresh martensite and tempered martensite in this invention are responsible for achieving ultra-high strength values in this invention. Furthermore, the absence of carbides due to presence of Si and Al in the steel reduces damage initiation in the steel during deformation giving high total elongation value. Retained austenite is minimised to below 1 vol. % since it is detrimental due to its low stability for impact toughness.

Retained austenite results from carbon partitioning from martensite to austenite during coil cooling. Carbon increases the stability of austenite by decreasing the Ms-temperature. However, in the present invention retained austenite is deliberately avoided because it is difficult to control the mechanical stability of retained austenite during different deformation and forming processes. Retained austenite should have very high mechanical stability for its beneficial effect of increasing elongation (i.e. stretchability) and impact toughness. It needs very high carbon saturation along with fine film-type morphology to improve these properties. The high carbon supersaturation during a low temperature continuous cooling process such as in coil cooling is very difficult to achieve. When the mechanical stability of austenite is low, it transforms quickly to martensite and creates brittle interfaces with the matrix phase which affect total elongation. Retained austenite with low mechanical stability transforms even faster in a dynamic loading process such as in impact and reduces the impact toughness. Therefore, in this invention a more homogeneous microstructure has been created by tempered martensite and fresh martensite, without presence of high amount of retained austenite. In other words, the presence of retained austenite is purposefully avoided and its maximum amount has been limited to 1 vol. %.

Another motivation to avoid or minimise retained austenite phase in this invention is to reduce the propensity of liquid metal embrittlement (LME) phenomenon during welding of Zn or Zn-alloy coated steel. It is known that Zn or Zn-alloy coated steels with retained austenite phase in their microstructures are more prone to LME during welding.

This has been achieved by using the low temperature coiling in the range of (Ms-50) ° C. to (Ms-160) ° C., which is a temperature range where substantial carbon partitioning is not expected to stabilise high amounts of austenite.

Rp, Rm and total elongation were determined from quasistatic (strain rate $3 \times 10^{-4}$ s$^{-1}$) tensile tests at room temperature with JIS No. 5 specimen geometry with tensile testing parallel to the rolling direction according to EN 10002-1/150 6892-1. The geometry of the tensile specimens consisted in 50 mm gauge length in the rolling direction, 25 mm in width and a thickness of 3.2 mm. The strength of the steel at 0.2% offset strain is measured as the yield strength (Rp or YS). The ratio of yield strength to ultimate tensile strength (Rp/Rm) is expressed as the yield ratio.

The bendability was determined by three-point bending tests following VDA 238-100 standard on 3.2 mm thick, 40 mm×30 mm specimens in both longitudinal and transverse directions. The bending axis was along the 30 mm dimension and the bending radius was 0.4 mm. The bending angles obtained from the strips with different thicknesses (2.8, 3.2 and 3.5 mm thickness respectively) were converted to the angles corresponding to 1.0 mm thickness using the following formula: bending angle at 1.0 mm thickness=measured angle×square root of actual thickness in mm. From these converted bending angles, for a specific heat treatment condition the lowest value of the longitudinal and the transverse specimens was taken to claim the ranges in this invention.

The flangeability of the steel or the hole expansion capacity (HEC) was determined by hole expansion tests. Specimens of dimension 90 mm×90 mm×3.2 mm were cut from the as-coiled steel. A hole of 10 mm diameter was punched in the middle of the specimens, and the hole expansion tests were carried out according to ISO/TS 16630: 2003(E) standard. The HEC value was determined by the formula: HEC=(expansion of the initial hole diameter/initial diameter)×100%.

The Charpy impact toughness was measured by using full-size Charpy V-notch (CVN) specimens (55 mm×10 mm×10 mm) according to the ASTM A370 standard. Tests were done in both sheet directions by machining the V-notch parallel and perpendicular to the rolling direction.

For all the above mechanical tests, at least three specimens were tested for each condition and the average values are reported.

The microstructure was analysed using a combination of techniques—optical microscopy, X-ray diffraction (XRD), scanning electron microscopy (SEM) and dilatometry. Dilatometry tests on (l×w×t) 10 mm×5 mm×3.2 mm specimens were done by heating the specimens at a rate of 10° C./s to 950° C., holding for 2 minutes and cooling to room temperature at a rate of 100° C./s (quenching for Ms) or 0.3° C./s (slow cooling for Ar3). From the dilatometry data, the Ms and Ar3 temperatures were determined. The amount of initial martensite (i.e. also the tempered martensite which gets tempered after coil cooling) after coiling the steel was determined by using Koistinen-Marburger formula given in the following literature: "A general equation prescribing the extent of the austenite-martensite transformation in pure iron-carbon alloys and plain carbon steels" by D. P. Koistinen, R. E. Marburger, Acta Metallurgica, vol. 7, 1959, pp. 59-60.

$$f=100 \cdot \{1-\exp(-(1.10 \times 10^{-2}(M_s-CT))\}$$

Where Ms is the martensite start temperature (in ° C.) and CT is the coiling temperature (in ° C.), so (Ms-CT) reflects the undercooling below Ms at the beginning of the coil cooling and is therefore a measure for the amount of initial martensite.

The amount of retained austenite was determined by XRD at ¼ thickness location of the samples. The XRD patterns were recorded in the range of 45 to 165° (2 Θ) on a Panalytical Xpert PRO standard powder diffractometer (Co Kα-radiation). Quantitative determination of phase proportions was performed by Rietveld analysis using Bruker Topas software package for Rietveld refinement. The amounts of carbides, ferrite, pearlite and bainites in the microstructure were determined by analysing high resolution SEM images. By subtracting the initial martensite and other phase fractions as applicable (retained austenite, carbide and other determined phases) from the total amount, the fresh martensite fractions were obtained.

The composition of the zinc or zinc alloy coating is not limited. Although the coating can be applied in various ways, hot dip galvanising is preferred using a standard GI coating bath. The Zn based coating may comprise a Zn alloy containing Al as an alloying element. A preferred zinc bath composition contains 0.10-0.35 wt. % Al, the remainder being zinc and unavoidable impurities.

Other Zn coatings may also be applied. An example comprises a zinc alloy coating according to WO 2008/102009, in particular a zinc alloy coating layer consisting of 0.3-4.0 wt. % Mg and 0.05%-6.0 wt. % Al, preferably 0.1 to 5.0% Al, and optionally at most 0.2 wt. % of one or more additional elements along with unavoidable impurities and the remainder being zinc. A preferred Zn bath comprising Mg and Al as main alloying elements has the composition: 0.5-3.8 wt. % Al, 0.5-3.0 wt % Mg, optionally at most 0.2% of one or more additional elements; the balance being zinc and unavoidable impurities. An additional element typically added in a small amount of less than 0.2 wt. %, could be selected from the group comprising Pb, Sb, Ti, Ca, Mn, Sn, La, Ce, Cr, Ni, Zr and Bi. Pb, Sn, Bi and Sb are usually added to form spangles. Preferably, the total amount of additional elements in the zinc alloy is at most 0.2 wt. %. These small amounts of an additional element do not alter the properties of the coating nor the bath to any significant extent for the usual applications. Preferably, when one or more additional elements are present in the coating, each is present in an amount <0.02 wt. %, preferably each is present in an amount <0.01 wt. %. Additional elements are usually only added to prevent dross forming in the bath with molten zinc alloy for the hot dip galvanising, or to form spangles in the coating layer.

In another embodiment the metallic coating comprises a (commercially pure) aluminium layer or an aluminium alloy layer. A typical metal bath for hot dip coating such an aluminium layer comprises aluminium alloyed with silicon e.g. aluminium alloyed with 8 to 11 wt. % of silicon and at most 4% of iron, optionally at most 0.2% of one or more additional elements such as calcium, unavoidable impurities, the remainder being aluminium. Silicon is present in order to prevent the formation of a thick iron-metallic intermetallic layer which reduces adherence and formability. Iron is preferably present in amounts between 1 and 4%, more preferably at least 2%.

EXAMPLES

Steel ingots of seven inventive chemistries A-B and D-H and a comparative steel C of dimensions, 200 mm×100 mm×100 mm were cast by melting the charges in a vacuum induction furnace. The chemical compositions of these steels are given in Table 1. Steel A-B and D-H contain C, Si and Al within the defined boundaries of the invention, whereas the comparative steel has Al and Si outside the defined boundaries in the invention. All the ingots were reheated for 1 hour at 1200° C., and rough-rolled to 25 mm thickness. Then, the strips were reheated again at 1200° C. for 30 minutes, and hot rolled to their final thicknesses of 2.8, 3.2 mm, 3.5 and 12 mm with FRTs above 900° C. which are in the austenitic phase field for all the steels. The Ar3 and Ms for the steels as measured by dilatometry are also given in Table 1.

After hot rolling, the steels were immediately subjected to run-out table cooling at various cooling rates and then coil cooling simulations were done in a muffle furnace by cooling to the room temperature from different starting CTs. Then the strips were pickled to remove the oxides in the conventional way.

The various processing conditions of the steels are summarised in Table 2. The A, B and C have similar Ms and Ar3. The FRT temperature for steel A was 953° C., for steel B 939° C. and for steel C 945° C., all of which lie at least 50° C. above the Ar3. For steels A and B, a slow run-out table cooling rate (ROT-CR) of 3° C./s, which is outside the defined lower boundary of the invention, was used. Also, two additional coiling temperatures (200° C. and 480° C.), outside the defined boundaries of this invention, were used for steels A and B with the FRT and CT within the boundaries required in the invention. The CT of 200° C. is much lower than (Ms-160) ° C. and 480° C. is above the Ms of these steels. These conditions were used for comparison purposes. For steel C, which has chemistry outside the coverage of this invention, all the processing conditions (FRT, ROT-CR and CT) were chosen within the defined boundaries of this invention. For steels D-F, one set of process parameters were within the claimed ranges for this invention (FRT, ROT-CR and CT), however for the other set FRT and ROT-CR were kept the same but for only the CT was kept higher for comparison purposes. In this case a CT of 375° C. was used which was higher than the (Ms−50° C.) for steels D-F. In fact, this CT was slightly higher than their Ms temperatures. For steels G-H all the processing parameters were kept within the boundaries required by the current invention.

The specimens were extracted from the final steel strips for various mechanical and microstructural characterisation as described. The 12 mm thick hot rolled steels were used for preparing Charpy impact specimens whereas the 2.8, 3.2 and 3.5 mm thick steel strips were used for all other characterisation.

For various processing conditions, the phase contents in the microstructures are presented in Table 3, the tensile properties are given in Table 4, bending and HEC test results in Table 5, and Charpy impact toughness are given in Table 6. The following are the abbreviations and symbols that have been used in the tables for presenting the tensile and bending tests results: Rp=yield strength, Rm=ultimate tensile strength, Ans5=total elongation using JIS5 specimens, BA=bending angle, L=longitudinal specimen where bending axis is parallel to the rolling direction, T=transversal specimen where bending axis is perpendicular to the rolling direction.

Table 3 shows that steel A and B achieved microstructures consisting of tempered martensite and fresh martensite of less than 85 vol. % and at least 15 vol. % respectively by using the FRT and ROT-CR within the defined boundaries for a CT ranging from 275 to 375° C. which falls within the required range for this invention. Also, the steels have no carbide in their microstructures and retained austenite content was less than 1 vol. % for these processing conditions. Their microstructures did not contain any other phase such as ferrite, bainite or pearlite.

Steels A-B, when subjected to a ROT-CR>20° C./s with FRT at a temperature higher than 50° C. above Ar3, yielded microstructures with substantial amounts of bainite and retained austenite with some amounts of fresh martensite forming below Ms when coiled at 480° C. which is above the Ms of these steels. There were no carbides present in these steels for this coiling condition because of their Al and Si contents. The high retained austenite contents were caused by carbon enrichment in austenite during bainitic transformation above Ms and the fresh martensite formed during coil cooling below Ms. These bainitic microstructures with high amounts of retained austenite are different from the microstructures intended in this invention.

Similarly, when the steels A and B are coiled at 200° C. which is much lower than Ms−160° C. of these steels, the microstructure of the steels also become different from that is required for this invention. This CT condition has higher than 85 vol. % tempered martensite and lower than 15 vol. % fresh martensite. On the other hand, steels A and B when had FRT and CT within the required range for this invention but with a slower ROT-CR of 3° C./s (lower than 20° C./s) showed considerable amounts of ferrite and pearlite in their microstructures in addition to a bainite matrix and substantial amounts of retained austenite. The ferrite, pearlite and bainite formed due to slow ROT-CR before coiling.

Steel C formed a considerable amount of carbides (2.3 vol. %) during processing with all the parameters within the required range for this invention due to the low amounts of Si and Al in steel C.

As results of the above described microstructures, the properties have been obtained as given in Table 4 to 6. Steels A and B achieved Rp above 1100 MPa and Rm above 1200 MPa with a yield ratio higher than 0.85 together with a total elongation (AJIS5) higher than 8.5%. When the CT is too high (480° C.), the minimum levels of Rp and Rm targeted in this invention are not achieved in steels A and B due to the presence of softer phases—bainite and retained austenite—although the total elongation is high. The low Rp values for the CT of 480° C. also caused the yield ratio to be less than 0.85. On the other hand, when the CT is too low (CT=200° C.), the Rp and Rm are above the target values with a high yield ratio but the total elongation is too low (<8.5%). The low total elongation is caused by too high amount of initial martensite (=tempered martensite>85 vol. %) present in the microstructure and lack of tempering effect during coil cooling due to less availability of time and too low temperature for effective tempering to take place.

With a slow ROT-CR of 3° C./s, the Rp and Rm values in steels A and B are lower than 1100 MPa and 1200 MPa respectively because of the formation of the softer phases of bainite, ferrite, pearlite and retained austenite. Also, the yield ratio is lower than 0.85, although the total elongation is high.

Steel C, because of the presence of carbides in its microstructure due to the absence of carbide-suppressing elements Si and Al, achieved low Rp, Rm, yield ratio and total elongation values. Carbides are detrimental to mechanical properties and promote damage during deformation. Therefore, low levels of tensile properties have been obtained in steel C.

Like the tensile properties, the bendability and HEC also are high in steels A and B when processed within the defined processing variables (FRT, ROT-CR and CT) of this invention (Table 5). A minimum bending angle of 80° at 1.0 mm thickness has been achieved and a minimum HEC value of 50% has also been obtained. However, when the CT is high and above the Ms of the steels (i.e. 480° C.), the minimum bending angle and HEC both are low and below the target values of 80° at 1.0 mm thickness and 50% respectively. This is because due to the multiphase nature of the microstructures of these steels containing fresh martensite, bainite and retained austenite (Table 3), numerous damage initiating sites were present in the interfaces of these phases when deformation were carried out. The martensite, present as fresh martensite and formed due to TRIP effect from retained austenite, both are stronger phases than bainite and any untransformed retained austenite. On the other hand, for the ideal processing conditions with optimum amounts of tempered martensite and fresh martensite in steels A and B, there was a low hardness or strength difference between these phases causing a homogeneous deformation during bending and hole expansion. This caused high HEC and bending values with ideal processing conditions.

Furthermore, with a too low CT of steel A and B below the Ms (200° C.), the bendability and HEC values are also low because of too high amount of tempered martensite (>85 vol. %) present in their microstructures (Table 3). The lack of effective tempering of this initial martensite present just in the beginning of coiling caused a low ductility, which was also reflected in their total elongation values in Table 4, caused the low formability of these steels as measured by bendability and HEC.

When a slow ROT-CR is employed (3° C./s), the presence of the softer phases of ferrite and pearlite also deteriorated the bendability and HEC values of steels A and B as seen from Table 5. This is because of the brittle interfaces of these softer phases and harder phases of bainite and martensite which is obtained after transformation of retained austenite during loading.

Steel C achieved very poor bendability and HEC values, much lower than the minimum value of 80° at 1.0 mm thickness and 50% respectively. These poor formability parameters in steel C have been caused by the very low Al and Si contents in the steel which promoted formation of carbides (Table 3), even though the processing variable were within the specified range for this invention.

The Charpy impact toughness of steel A, processed according to the invention, in transverse specimens (which showed the lower values than the longitudinal specimens) is higher than 100 J and 40 J when tested at room temperature and −40° C. respectively. The same values with the high CT of 480° C. and lower CT of 200° C. are much lower than the minimum values obtained with the ideal processing route described in this invention. As explained earlier, these low toughness values are caused by brittle fracture caused by spontaneous transformation of retained austenite to martensite, presence of heterogeneously harder and softer phases and low tempering effects. Furthermore, the presence of carbides in steel C resulted in also poor Charpy impact toughness values both at room temperature and cryogenic temperature.

Therefore, as it has been discussed above these examples illustrate that when the steel is designed according to the composition of the invention and processed according to the invention, the steel achieves tensile, formability and toughness properties high, as intended, due to their microstructural effects. The same good combination of all properties is not achieved when working outside the boundaries defined in the invention.

The Nb contents in steels A-G are at a residual level. No niobium was added as alloying element in these steels. Niobium was added as an alloying element in steel H.

Steels A-B have a Mn content of about 1.8% and steels D-H have a Mn content of about 2.35 with varying amounts of Si and Nb. The effect of the Mn is a reduction in Ms and it causes a shift in the ratio of tempered martensite to fresh martensite. Although steels D-H show lower values for A JIS5, HEC and the bending angle than steels A and B, the steels D-H are nevertheless fit for purpose.

As shown in Table 3, steels D-H achieved microstructures consisting of tempered martensite and fresh martensite of less than 85 vol. % and at least 15 vol. % respectively by using the FRT and ROT-CR within the defined boundaries for a CT of 275° C. (steels D-F) and 300° C. (steels G-H) which fall within the required range for this invention. Also, the steels have no carbide in their microstructures and retained austenite content was less than 1 vol. % for these processing conditions. Their microstructures did not contain any other phase such as ferrite, bainite or pearlite.

Steels D-H also achieved Rp above 1100 MPa and Rm above 1200 MPa with a yield ratio of 0.85 or higher together with a total elongation (AJIS5) higher than 6% (Table 4). The bendability and HEC also are high in steels D-H when processed within the defined processing variables (FRT, ROT-CR and CT) of this invention (Table 5). A minimum bending angle of 70° at 1.0 mm thickness and a minimum HEC value of 30% has been achieved in these steels.

However, when the CT of steels D-F is high, i.e. 375° C., which is slightly above the Ms of the steels, the microstructures of the steels contain some amounts of bainite and more than 1 vol. % of retained austenite (Table 3) which are not intended to achieve in the microstructures in this invention, and the contents of fresh martensite and tempered martensite also fall outside the range defined in this invention. These unintended microstructures do not lead to the desired ultra-high strengths in these steels for CT of 375° C. The Rp values are below 1100 MPa and Rm values are below 1200 MPa with yield ratio lower than 0.85 due to the presence of softer phases of bainite and retained austenite (Table 4) although good bendability and HEC values are achieved (Table 5). Thus, steels which may have chemical composition within the defined boundaries of this invention, may not achieve all the desired mechanical properties if the processing is not carried out within the defined windows of this invention.

TABLE 1

Chemical compositions of the steels in wt. %

| Steel | C | Si | Al | Mn | P | S | N | Nb | Ms (° C.) | Ar3 (° C.) | |
|---|---|---|---|---|---|---|---|---|---|---|---|
| A | 0.20 | 1.00 | 0.036 | 1.82 | 0.010 | 0.0010 | 0.0020 | — | 428 | 827 | I |
| B | 0.20 | 0.81 | 0.31 | 1.82 | 0.010 | 0.0012 | 0.0012 | — | 435 | 835 | I |
| C | 0.21 | 0.10 | 0.02 | 1.85 | 0.010 | 0.0012 | 0.0006 | — | 430 | 829 | C |
| D | 0.20 | 1.0 | 0.03 | 2.31 | 0.001 | 0.0001 | 0.0012 | 0.001 | 366 | 834 | I |
| E | 0.21 | 0.81 | 0.31 | 2.30 | 0.001 | 0.0001 | 0.0020 | 0.001 | 374 | 854 | I |
| F | 0.21 | 0.80 | 0.03 | 2.30 | 0.001 | 0.0001 | 0.0008 | 0.001 | 374 | 831 | I |
| G | 0.18 | 0.81 | 0.033 | 2.39 | 0.001 | 0.0001 | 0.0030 | 0.001 | 390 | 840 | I |
| H | 0.18 | 0.80 | 0.032 | 2.40 | 0.001 | 0.0001 | 0.0040 | 0.019 | 377 | 835 | I |

(I: Inventive, C: Comparison)

TABLE 2

Processing variables applied to the steels

| Steel | Final thickness (mm) | FRT (° C.) | ROT-CR (° C./s) | Coiling Temperature (° C.) | |
|---|---|---|---|---|---|
| A | 3.2/12* | 953 | 31 | 275, 300, 325, 350, 375 | I |
|   | 3.2/12* | 953 | 31 | 480, 200 | C |
|   | 3.2/12* | 953 | 3 | 325 | C |
| B | 3.2 | 939 | 34 | 275, 300, 325, 350, 375 | I |
|   | 3.2 | 939 | 34 | 480, 200 | C |
|   | 3.2 | 939 | 3 | 325 | C |
| C | 3.2/12 | 945 | 34 | 350 | C |
| D | 2.8 | 962 | 45 | 275 | I |
|   | 2.8 |  | 45 | 375 | C |
| E | 2.8 | 965 | 48 | 275 | I |
|   | 2.8 |  | 48 | 375 | C |
| F | 2.8 | 968 | 53 | 275 | I |
|   | 2.8 |  | 53 | 375 | C |
| G | 3.5 | 973 | 47 | 300 | I |
| H | 3.5 | 976 | 46 | 300 | I |

*12 mm thickness is needed for Charpy tests, other thicknesses were used to determine microstructure, tensile properties, bending angle and HEC.

TABLE 3

| | | | | Microstructure of the steels | | | | |
|---|---|---|---|---|---|---|---|---|
| Steel | | ROT-CR (° C./s) | Coiling_T (° C.) | Tempered Martensite (Vol. %) | Fresh Martensite (Vol. %) | Retained Austenite (Vol. %) | Carbide (Vol. %) | Others (Vol. %) | |
| A | 1 | 31 | 275 | 81.4 | 18.2 | 0.4 | 0 | — | I |
| | 2 | 31 | 300 | 75.5 | 23.8 | 0.7 | 0 | — | I |
| | 3 | 31 | 325 | 67.8 | 31.9 | 0.3 | 0 | — | I |
| | 4 | 31 | 350 | 57.6 | 42.3 | 0.1 | 0 | — | I |
| | 5 | 31 | 375 | 44.2 | 55.7 | 0.1 | 0 | — | I |
| | 6 | 31 | 480 | — | 13.8 | 11.2 | 0 | B: 75.0 | C |
| | 7 | 31 | 200 | 91.6 | 8.3 | 0.1 | 0 | — | C |
| | 8 | 3 | 325 | — | — | 5.3 | 0 | B = 63.5 F + P = 31.2 | C |

| Steel | | ROT-CR (° C./s) | Coiling_T (° C.) | Tempered Martensite (Vol. %) | Fresh Martensite (Vol. %) | Retained Austenite (Vol. %) | Carbide (Vol. %) | Others (Vol. %) | |
|---|---|---|---|---|---|---|---|---|---|
| B | 1 | 34 | 275 | 82.8 | 16.7 | 0.5 | 0 | — | I |
| | 2 | 34 | 300 | 77.3 | 22.4 | 0.3 | 0 | — | I |
| | 3 | 34 | 325 | 70.2 | 29.8 | 0.0 | 0 | — | I |
| | 4 | 34 | 350 | 60.7 | 39.3 | 0.0 | 0 | — | I |
| | 5 | 34 | 375 | 48.3 | 51.7 | 0.0 | 0 | — | I |
| | 6 | 34 | 480 | — | 12.1 | 10.5 | 0 | B: 77.4 | C |
| | 7 | 34 | 200 | 92.5 | 7.5 | 0.0 | 0 | — | C |
| | 8 | 3 | 325 | | | 6.1 | 0 | B = 65.3 F + P = 28.6 | C |
| C | | 34 | 350 | 39.2 | 58.5 | 0.0 | 2.3 | — | C |
| D | | 45 | 275 | 63.2 | 36.2 | 0.6 | 0 | — | I |
| | | 45 | 375 | 10.2 | 63.0 | 5.3 | 0 | B = 21.5 | C |
| E | | 48 | 275 | 66.3 | 33.0 | 0.7 | 0 | — | I |
| | | 48 | 375 | 11.4 | 74.0 | 4.3 | 0 | B = 10.3 | C |
| F | | 53 | 275 | 66.3 | 33.2 | 0.5 | 0 | — | I |
| | | 53 | 375 | 10.4 | 75.0 | 4.5 | 0 | B = 10.1 | C |
| G | | 47 | 300 | 62.8 | 36.8 | 0.4 | 0 | — | I |
| H | | 46 | 300 | 57.1 | 42.6 | 0.3 | 0 | — | I |

(B: bainite, P: pearlite, F: ferrite)

TABLE 4

| | | | Tensile properties of the steels | | | | | |
|---|---|---|---|---|---|---|---|---|
| Steel | | ROT-CR (° C./s) | Coiling_T (° C.) | Rp (MPa) | Rm (MPa) | A JIS5 (%) | Yield ratio (—) | |
| A | 1 | 31 | 275 | 1188 | 1379 | 10.1 | 0.86 | I |
| | 2 | 31 | 300 | 1176 | 1351 | 8.8 | 0.87 | I |
| | 3 | 31 | 325 | 1178 | 1333 | 9.3 | 0.88 | I |
| | 4 | 31 | 350 | 1143 | 1292 | 9.3 | 0.89 | I |
| | 5 | 31 | 375 | 1110 | 1217 | 9.2 | 0.91 | I |
| | 6 | 31 | 480 | 693 | 983 | 16.8 | 0.70 | C |
| | 7 | 31 | 200 | 1215 | 1435 | 6.3 | 0.85 | C |
| | 8 | 3 | 325 | 670 | 932 | 11.7 | 0.72 | C |
| B | 1 | 34 | 275 | 1148 | 1327 | 9.0 | 0.87 | I |
| | 2 | 34 | 300 | 1150 | 1321 | 9.1 | 0.87 | I |
| | 3 | 34 | 325 | 1148 | 1300 | 10.0 | 0.88 | I |
| | 4 | 34 | 350 | 1137 | 1263 | 10.4 | 0.90 | I |
| | 5 | 34 | 375 | 1127 | 1228 | 9.6 | 0.92 | I |
| | 6 | 34 | 480 | 705 | 979 | 15.3 | 0.72 | C |
| | 7 | 34 | 200 | 1220 | 1428 | 6.4 | 0.85 | I |
| | 8 | 3 | 325 | 663 | 927 | 12.1 | 0.72 | C |
| C | | 34 | 350 | 781 | 1079 | 6.1 | 0.73 | C |
| D | 1 | 45 | 275 | 1140 | 1331 | 6.9 | 0.86 | I |
| | 2 | 45 | 375 | 755 | 944 | 13.6 | 0.80 | C |
| E | 1 | 48 | 275 | 1132 | 1334 | 7.0 | 0.85 | I |
| | 2 | 48 | 375 | 767 | 913 | 11.5 | 0.84 | C |
| F | 1 | 53 | 275 | 1122 | 1314 | 6.8 | 0.85 | I |
| | 2 | 53 | 375 | 835 | 1044 | 7.0 | 0.80 | C |
| G | | 47 | 300 | 1123 | 1300 | 8.9 | 0.86 | I |
| H | | 46 | 300 | 1212 | 1374 | 8.7 | 0.88 | I |

TABLE 5

| | | Bendability and HEC of the steels | | | | | | |
|---|---|---|---|---|---|---|---|---|
| Steel | | ROT-CR (° C./s) | Coiling_T (° C.) | Measured BA-L (°) | Measured BA-T @ (°) | BA-L @ 1.0 mm (°) | BA-T @ 1.0 mm (°) | HEC (%) | |
| A | 1 | 31 | 275 | 45.0 | 56.7 | 80.5 | 101.4 | 67 | I |
| | 2 | 31 | 300 | 56.1 | 61.4 | 100.4 | 109.8 | 72 | I |
| | 3 | 31 | 325 | 68.5 | 67.3 | 122.5 | 120.4 | 79 | I |
| | 4 | 31 | 350 | 77.8 | 72.9 | 139.2 | 130.4 | 94 | I |
| | 5 | 31 | 375 | 62.2 | 79.0 | 111.3 | 141.3 | 97 | I |
| | 6 | 31 | 480 | 35.5 | 37.2 | 63.5 | 66.5 | 27 | C |
| | 7 | 31 | 200 | 37.2 | 38.3 | 66.5 | 68.5 | 19 | C |
| | 8 | 3 | 325 | 39.2 | 49.1 | 70.1 | 71.7 | 21 | C |
| B | 1 | 34 | 275 | 61.4 | 59.5 | 109.8 | 106.4 | 52 | I |
| | 2 | 34 | 300 | 59.3 | 61.5 | 106.1 | 110.0 | 83 | I |
| | 3 | 34 | 325 | 48.5 | 69.0 | 86.8 | 123.4 | 77 | I |
| | 4 | 34 | 350 | 69.1 | 69.3 | 123.6 | 124.0 | 76 | I |
| | 5 | 34 | 375 | 55.7 | 75.0 | 99.6 | 134.2 | 98 | I |
| | 6 | 34 | 480 | 33.5 | 35.1 | 59.9 | 62.8 | 21 | C |
| | 7 | 34 | 200 | 34.8 | 36.1 | 62.3 | 64.6 | 18 | C |
| | 8 | 3 | 325 | 37.2 | 39.7 | 66.5 | 71.0 | 23 | C |
| C | | 34 | 350 | 35.8 | 37.2 | 64.0 | 66.5 | 15 | C |
| D* | 1 | 45 | 275 | 93.6 | 76.2 | 156.6 | 127.5 | 41 | I |
| | 2 | 45 | 375 | 75.8 | 107.6 | 126.8 | 180.0 | 57 | C |
| E* | 1 | 48 | 275 | 53.3 | 43.4 | 89.2 | 72.6 | 42 | I |
| | 2 | 48 | 375 | 77.0 | 93.6 | 128.8 | 156.6 | 38 | C |
| F* | 1 | 53 | 275 | 57.7 | 68.0 | 96.6 | 113.8 | 32 | I |
| | 2 | 53 | 375 | 90.6 | 105.8 | 151.6 | 177.0 | 35 | C |
| G** | | 47 | 300 | 43.9 | 61.4 | 82.2 | 114.8 | 76 | I |
| H** | | 46 | 300 | 45.3 | 44.1 | 84.8 | 82.4 | 42 | I |

A-C bending angle measured @ 3.2 mm; *D-F bending angle measured @ 2.8 mm thickness; **G, H bending angle measured @ 3.5 mm thickness.

TABLE 6

Charpy impact toughness of the steels

| Steel | | ROT-CR (° C./S) | Coiling_T (° C.) | Charpy Impact Toughness (J) | | | |
|---|---|---|---|---|---|---|---|
| | | | | Room Temperature | | −40° C. | |
| | | | | L | T | L | T |
| A | 1 | 31 | 275 | 136.9 | 109.6 | 90.8 | 42.1 |
| | 2 | 31 | 300 | 135.8 | 111.2 | 93.2 | 45.7 |
| | 3 | 31 | 325 | 140.1 | 115.8 | 95.1 | 46.3 |
| | 4 | 31 | 350 | 143.7 | 120.0 | 99.8 | 49.1 |
| | 5 | 31 | 375 | 144.0 | 120.2 | 100.3 | 49.5 |
| | 6 | 31 | 480 | 90.1 | 75.1 | 55.1 | 30.2 |
| | 7 | 31 | 200 | 76.1 | 69.2 | 30.5 | 26.1 |
| | 8 | 3 | 325 | 57.8 | 53.2 | 23.5 | 19.1 |
| C | | 34 | 350 | 70.2 | 75.8 | 28.3 | 15.6 |

(L = longitudinal specimen, T = transverse specimen)

BRIEF DESCRIPTION OF THE DRAWINGS

The invention will now be explained by means of the following, non-limiting figures.

A schematic of the thermomechanical processing of this invention is given in FIG. 1.

A schematic drawing of a hot-rolling mill for processing thick cast slabs is shown in FIG. 2a, and a thin slab casting facility with a direct rolling mill is shown in FIG. 2b.

Figure 1:
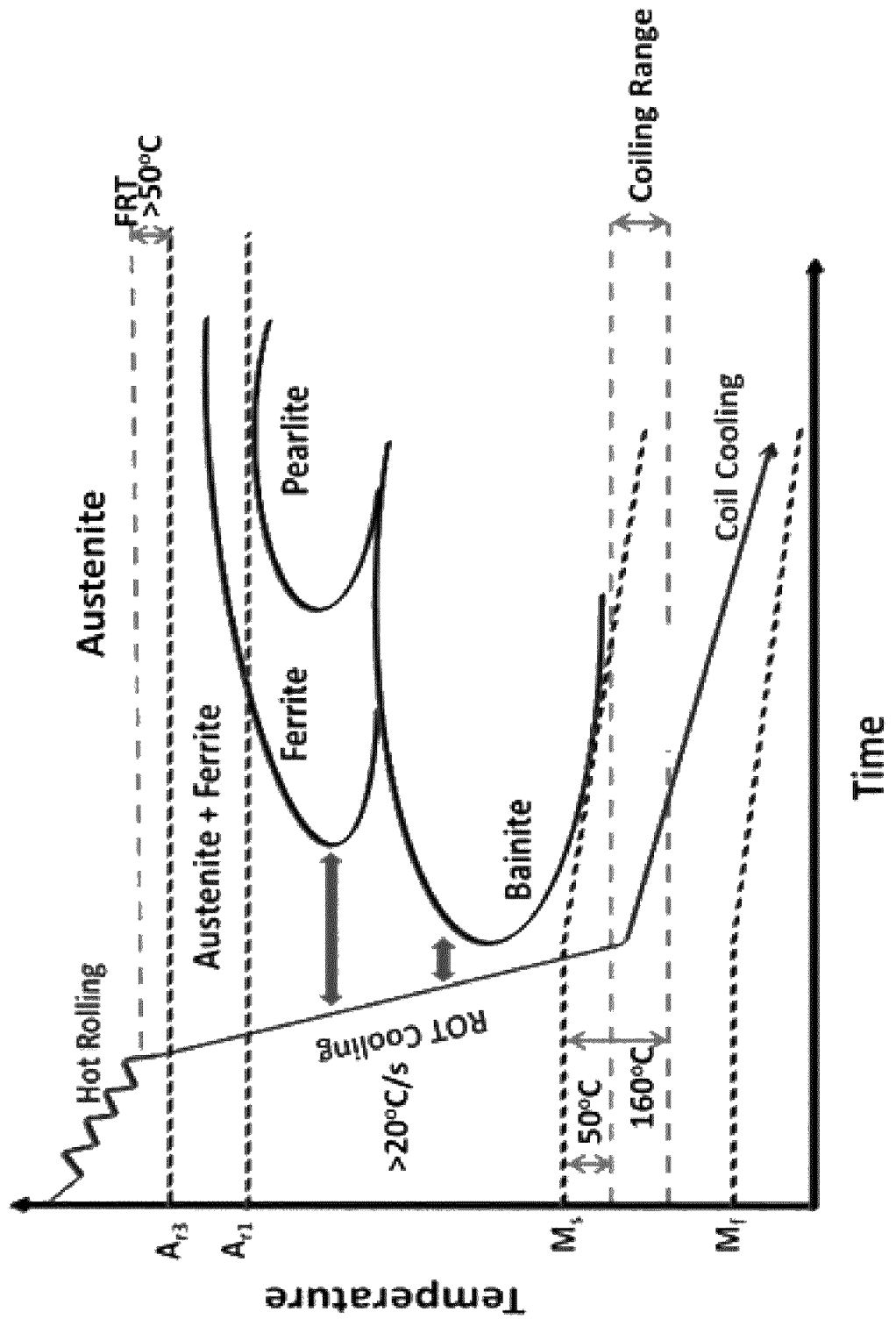
Figure 3:
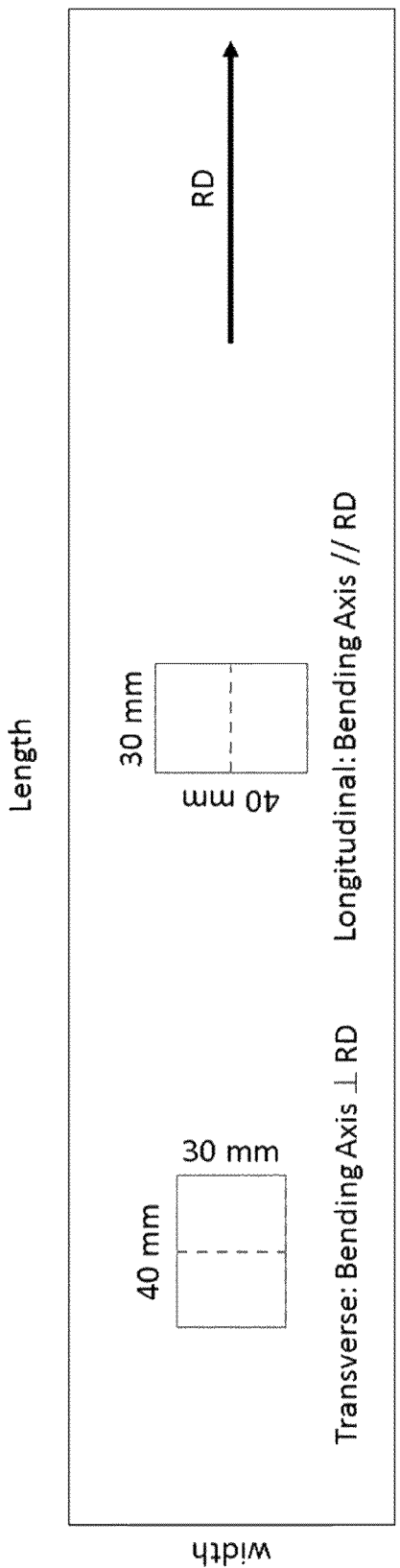
Figure 4:
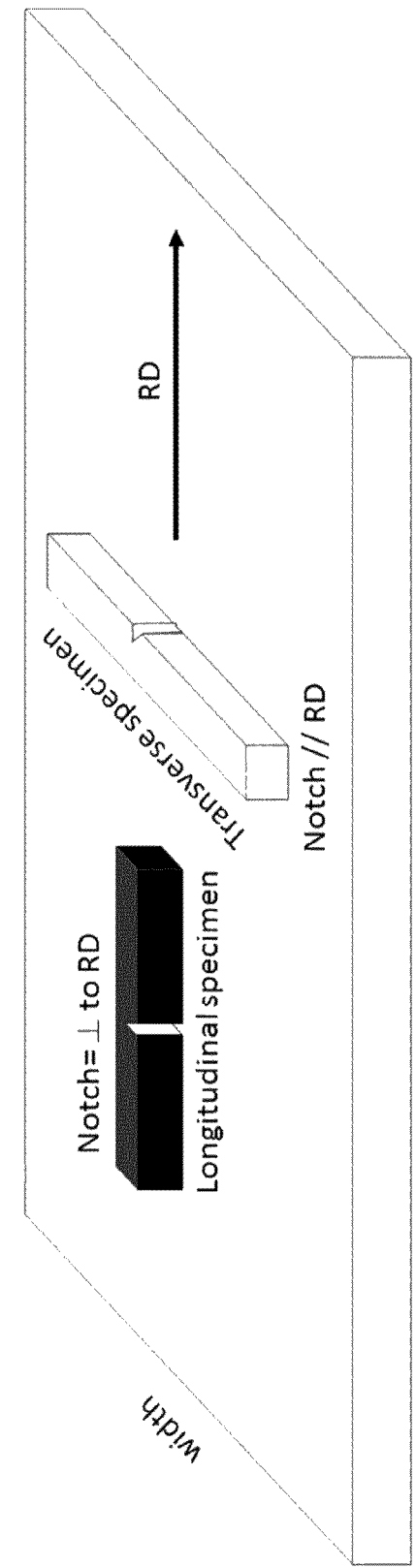

FIGS. 3 and 4 show the geometry and definitions for bending samples and Charpy samples.

The invention claimed is:

1. A hot-rolled steel strip comprising (in wt. %):
C: 0.10-0.30;
Si 0.50-1.0;
Al 0.030-0.31;
Mn: 1.65-2.50;
(Si+Al): 0.80-1.31;
and optionally any one or more of alloying elements selected from:
V: less than 0.10;
Nb: less than 0.10;
Ti: less than 0.10;
Mo: less than 0.50;
Cr: less than 1.50;
Cu: less than 1.00;
Ni less than 0.50;
B: less than 0.0030 (30 ppm);
unavoidably also comprising:
N: less than 0.0100 (100 ppm);
S: less than 0.005;
P: less than 0.020;
the remainder being Fe and unavoidable impurities;
having a yield strength of at least 1100 MPa, an ultimate tensile strength of at least 1200 MPa, a yield ratio of at least 0.85, a total elongation of at least 6.0%, a hole expansion ratio of at least 30% and a bending angle at 1 mm thickness of at least 70°;
having a microstructure consisting of 60 to 85 vol. % of tempered martensite, 40 to 15 vol. % of fresh martensite, and less than 1 vol. % of retained austenite and no cementite or other carbides.

2. The hot-rolled steel strip according to claim 1, comprising (in wt. %):
Si: 0.70-1.0;
Al: 0.030-0.31;
Mn: 1.65-2.50.

3. The hot-rolled steel strip according to claim 1, having a yield strength of at least 1100 MPa, an ultimate tensile strength of at least 1200 MPa, a yield ratio of at least 0.85, a total elongation of at least 8.5%, a hole expansion ratio of at least 50%, a bending angle at 1 mm thickness of at least 80°, and a Charpy impact toughness of at least 40 J at −40° C. and at least 100 J at room temperature.

4. The hot-rolled steel strip according to claim 1, comprising in the following amounts (in wt. %):
Cu: 0.030-less than 1.00.

5. The hot-rolled steel strip according to claim 2, wherein the retained austenite of the microstructure is less than 0.7 vol. %.

6. The hot-rolled steel strip according to claim 1, wherein steel of the hot-rolled steel strip comprises
0.80-1.0 of Si;
0.036-0.31 of Al; and
1.65-2.50 wt. % of Mn.

7. The hot-rolled steel according to claim 1, wherein the sum of Al and Si is 1.00 to 1.31 wt. %.

8. The hot-rolled steel according to claim 1, provided with a metallic coating layer selected from a Zn-layer or a Zn-based alloy-layer or an Al-based alloy layer.

9. The hot-rolled steel strip according to claim 8, provided with the Zn-based alloy-layer, wherein the Zn-based alloy-layer consists of 0.3-4.0 wt. % Mg and 0.05-6.0 wt. % Al, and optionally at most 0.2 wt. % total additional elements and the remainder being zinc and unavoidable impurities.

10. A method of making the hot-rolled steel strip of claim 1 comprising the steps of:
casting a molten steel into a thick slab having a cast thickness of between 150 and 350 mm or a thin slab having a cast thickness of between 50 and 150 mm having a composition (in wt. %)
C: 0.10-0.30;
Si: 0.50-1.0;
Al: 0.030-0.31;
Mn: 1.65-2.50;
(Si+Al): 0.80-1.31;
and optionally any one or more of alloying elements selected from:
V: less than 0.10;
Nb: less than 0.10;
Ti: less than 0.10;
Mo: less than 0.50;
Cr: less than 1.50;
Cu: less than 1.00;
Ni less than 0.50;
B: less than 0.0030 (30 ppm);
unavoidably also comprising
N: less than 0.0100 (100 ppm);
S: less than 0.005;
P: less than 0.020;
the remainder being Fe and unavoidable impurities
heating or reheating the slab,
hot-rolling the slab into the hot-rolled steel strip by
rough-rolling the thick slab into an intermediate gauge to break down the as-cast structure, followed by finish hot-rolling into the hot-rolled steel strip, with finish hot rolling temperature (FRT) above an Ar3 temperature of the steel, wherein Ar3 is a temperature where transformation of austenite to ferrite starts during cooling, or by
direct hot rolling of the thin slab to an intermediate gauge followed by finish rolling into the hot-rolled steel strip, with finish hot rolling temperature (FRT) above an Ar3 temperature of the steel, wherein Ar3 is a temperature where transformation of austenite to ferrite starts during cooling;

accelerated cooling of the hot rolled steel strip on a run-out table with a cooling rate higher than 20° C./s;

followed by coiling the hot-rolled steel strip at a temperature in the range of (Ms-50)° C. to (Ms-160)° C., where Ms is the martensite start temperature of the steel;

followed by allowing the coiled hot-rolled strip to further cool to ambient temperature;

followed by pickling the hot rolled steel strip;

the hot rolled steel strip having a yield strength of at least 1100 MPa, an ultimate tensile strength of at least 1200 MPa, a yield ratio of at least 0.85, a total elongation of at least 6.0%, a hole expansion ratio of at least 30% and a bending angle at 1 mm thickness of at least 70°;

having a microstructure consisting of 60 to 85 vol. % of tempered martensite, 40 to 15 vol. % of fresh martensite, less than 1 vol. % of retained austenite and no cementite or other carbides.

11. The method according to claim 10, further comprising providing the hot rolled steel strip with a metallic coating layer selected from a Zn-layer or a Zn-based alloy-layer or an Al-based alloy layer, obtained by hot-dip coating.

12. A part for a transport or an engineering application comprising a hot-rolled steel comprising (in wt. %):
C: 0.10-0.30;
Si: 0.50-1.0;
Al: 0.030-0.31;
Mn: 1.65-2.50;
(Si+Al): 0.80-1.31;
and optionally any one or more of alloying elements selected from:
V: less than 0.10;
Nb: less than 0.10;
Ti: less than 0.10;
Mo: less than 0.50;
Cr: less than 1.50;
Cu: less than 1.00;
Ni less than 0.50;
B: less than 0.0030 (30 ppm);
unavoidably also comprising:
N: less than 0.0100 (100 ppm);
S: less than 0.005;
P: less than 0.020;
the remainder being Fe and unavoidable impurities;
having a yield strength of at least 1100 MPa, an ultimate tensile strength of at least 1200 MPa, a yield ratio of at least 0.85, a total elongation of at least 6.0%, a hole expansion ratio of at least 30% and a bending angle at 1 mm thickness of at least 70°;

having a microstructure consisting of 60 to 85 vol. % of tempered martensite, 40 to 15 vol. % of fresh martensite, and less than 1 vol. % of retained austenite and no cementite or other carbides, wherein the part is a chassis part of a vehicle, or a suspension part of a vehicle, or a battery box or a frame of a heavy truck, or a crane boom.

13. The part according to claim 12, selected from a lower control arm, a frame rail, a bumper beam or a battery box or a frame of a heavy truck, or a crane boom.

14. The hot-rolled steel strip according to claim 9, provided with the Zn-based alloy-layer, wherein the Zn-based alloy-layer consists of 0.3-4.0 wt. % Mg and 0.1 to 5.0 wt. % Al, and optionally at most 0.2 wt. % of one or more additional elements and the remainder being zinc and unavoidable impurities.

15. The method according to claim 10, wherein the heating or reheating of the slab is at a temperature of 1100° C. or more and for a time of 30 minutes or more.

16. The method according to claim 10, further comprising providing the hot rolled steel strip with a metallic coating layer comprising a Zn-based alloy-layer, wherein the Zn-based alloy-layer consists of 0.3-4.0 wt. % Mg and 0.1 to 5.0% Al, and optionally at most 0.2 wt. % of one or more additional elements along with unavoidable impurities and the remainder being zinc.

17. The hot-rolled steel strip according to claim 1, comprising (in wt. %):
Si: 0.80-1.0; and
Al: 0.036-0.31;
Mn: 1.65-2.31.

18. The hot-rolled steel strip according to claim 1, comprising (in wt. %):
Si: 0.80-1.0;
Al: 0.036-0.31;
Mn 1.82-2.31; and
wherein the retained austenite of the microstructure is less than 0.7 vol. %.

19. The hot-rolled steel strip according to claim 17, having:
the total elongation of at least 6.4%, and
the hole expansion ratio of at least 67%.

20. The hot-rolled steel strip according to claim 18, having:
the bending angle at 1 mm thickness of at least 80°.

* * * * *